United States Patent [19]
Cheung

[11] Patent Number: 6,025,970
[45] Date of Patent: Feb. 15, 2000

[54] DIGITAL DEMODULATION OF A COMPLEMENTARY TWO-FREQUENCY SERVO PES PATTERN

[75] Inventor: Wayne L. Cheung, San Jose, Calif.

[73] Assignee: International Business Machines Corporation, Armonk, N.Y.

[21] Appl. No.: 08/908,742

[22] Filed: Aug. 7, 1997

[51] Int. Cl.$^7$ .................................................. G11B 5/596
[52] U.S. Cl. ..................................... 360/77.08; 360/77.02
[58] Field of Search ........................... 360/77.08, 77.05, 360/77.02, 75, 48

[56] References Cited

U.S. PATENT DOCUMENTS

| | | | |
|---|---|---|---|
| 3,404,392 | 10/1968 | Sordello | 340/174.1 |
| 3,449,734 | 6/1969 | Frey et al. | 340/174.1 |
| 3,474,432 | 10/1969 | Sevilla | 340/174.1 |
| 3,840,893 | 10/1974 | Jacoby et al. | 360/77 |
| 3,864,740 | 2/1975 | Sordello et al. | 360/77 |

(List continued on next page.)

OTHER PUBLICATIONS

T.D. Howell, "Pattern for Buried Servo", IBM Technical Disclosure Bulletin, vol. 23, No. 1, pp. 304–305, Jun. 1980.
Cramer et al., "Digital Information Track Format and Read–Write Appts", Jun. 22, 1995, Abstract for WO 95–16985.
Nobumasa Nishiyama, "Magnetic Disk Device and Method for Forming Servo Data", Aug. 13, 1993, Abstract from JP 5–205419.
Osamu Miyazaki, "Magnetic Disk Device", Feb. 13, 1992, Abstract from JP 4–42476.
Mizukami Makoto et al., "Method and Device for Writing Servo Track of Magnetic Disk Device", Oct. 11, 1989, Abstract from JP 01–253814.
Tsuguo Sato, "Discoid Magnetic Recording Medium", Aug. 2, 1989, Abstract from JP 1–37774.
Nemoto Shoji et al., "Tracking Controller", Sep. 29, 1988, Abstract from JP 63–234440.
Seiichirou Tamamushi, "Measuring Device of Off–Track Quantity of Magnetic Disc Device", Jun. 30, 1984. Abstract from JP 59–113572.
Terada Akimichi, "Automatic Scanner for Magnetic Recorder and Reproducer", Dec. 15, 1983, Absract from JP 58–215721.
"Tracking Eror Detection System Uses Two Different Frequency Signals to Compare Regenerated Level of Beat Signal and Standard Voltage", Aug. 2, 1982, from JP 57–123525.
Seo Yuzo, "Data Recording Medium and Data Recording/Reproducing Apparatus", Mar. 10, 1995, Abstract from JP 07–065518.
Kiyoshi Funa, "Magnetic Disk Device", Feb. 26, 1986, Abstract from JP 61–39986.
Yamano Minoru, "Tracking Servo System", May 8, 1986, Abstract from JP 61–090318.
Toru Okada, "Disk Device", Feb. 2, 1988, Abstract from JP 63–32772.

(List continued on next page.)

*Primary Examiner*—Andrew L. Sniezek
*Assistant Examiner*—Dan I. Davidson
*Attorney, Agent, or Firm*—Gray Cary Ware; Freidenrich

[57] ABSTRACT

A servo pattern has bursts that are constructed from two frequencies in a complementary arrangement so that the servo pattern frequencies alternate in adjacent servo tracks. The servo pattern is decoded by a pair of digital notched filters so that each filter notches out readback signal data from a different one of the frequencies to form a combined PES signal produced from each respective frequency and to control movement of the head servo. The complementary arrangement of the servo bursts decreases signal gain differences between the frequencies and improves the accuracy of servo position information. The digital notched filter provides efficient processing of the readback signal and enhances easier selection of filter parameters and easier design of the servo processing circuitry. The servo pattern uses less disk surface area as compared with typical dual or quadrature servo patterns and can be recorded on the disk using fewer servo write steps.

36 Claims, 6 Drawing Sheets

U.S. PATENT DOCUMENTS

| | | |
|---|---|---|
| 3,956,769 | 5/1976 | Beecroft et al. ................... 360/77 |
| 4,048,660 | 9/1977 | Dennison et al. .................. 360/77 |
| 4,084,201 | 4/1978 | Hack et al. ...................... 360/135 |
| 4,188,646 | 2/1980 | Sordello et al. ................... 360/77 |
| 4,209,810 | 6/1980 | Ragle et al. ...................... 360/77 |
| 4,348,703 | 9/1982 | Janosi ............................. 360/77 |
| 4,414,589 | 11/1983 | Oliver et al. ..................... 360/77 |
| 4,488,188 | 12/1984 | Hansen et al. .................... 360/77 |
| 4,549,232 | 10/1985 | Axmear et al. .................... 360/77 |
| 4,551,777 | 11/1985 | Saito et al. ...................... 360/77 |
| 4,616,275 | 10/1986 | Peeters ........................... 360/77 |
| 4,843,493 | 6/1989 | Furuhata et al. ................. 360/77.15 |
| 4,875,114 | 10/1989 | Moteki ........................... 360/77.08 |
| 4,975,791 | 12/1990 | Eggebeen ........................ 360/77.01 |
| 4,996,609 | 2/1991 | Joannou .......................... 360/57 |
| 5,121,375 | 6/1992 | Kuribayashi .................... 369/44.37 |
| 5,216,646 | 6/1993 | Imanaka et al. ................. 369/44.26 |
| 5,258,879 | 11/1993 | Shimotashiro et al. .......... 360/77.14 |
| 5,309,299 | 5/1994 | Crossland et al. .............. 360/77.01 |
| 5,408,373 | 4/1995 | Bajorek et al. ................... 360/104 |
| 5,442,498 | 8/1995 | Cheung et al. ................... 360/77.08 |
| 5,448,430 | 9/1995 | Bailey et al. .................... 360/77.12 |
| 5,453,887 | 9/1995 | Negishi et al. .................. 360/77.1 |
| 5,453,888 | 9/1995 | Tsunoda et al. ................. 360/77.08 |
| 5,726,823 | 3/1998 | Kisaka et al. .................... 360/77.08 |
| 5,774,298 | 6/1998 | Cheung et al. ................... 360/77.08 |
| 5,825,579 | 10/1998 | Cheung et al. ................... 360/77.08 |

OTHER PUBLICATIONS

Katakura Toru, "Recording and Reproducing Device for Discoid Recording Medium", May 31, 1988, Abstract from JP 63–127416.

"Combined Data/Servo Track Magnetoresistive Sensor for Magnetic Tape Heads", *Research Disclosure,* Aug. 1991, No. 328.

M. D. Levenson, "Reflectivity–Coded Phase–Sensing Servo for Optical Memories", Jul. 1989, *IBM Technical Disclosure Bulletin,* vol. 32, No. 2, pp. 74–76.

C. H. Bajorek et al., "Large Surface Air Bearing for a Flexible Disc File", Apr. 1976, *IBM Technical Discolsure Bulletin,* vol. 18, No. 11, pp. 3859–3860.

M. Barlow et al., "Thin Film Magnetic Head Assembly", Sep. 1981, *IBM Technical Disclosure Bulletin,* vol. 24, No. 4, pp. 1912–1913.

D. M. Jones, "Parallel Servo–Track Write and Read Verification with Side–by–Side Inductive Head Elements", Jan. 1984, *IBM Technical Disclosure Bulletin,* vol. 26, No. 8, pp. 4243–4244.

G. N. Tsilibes, "Transducer Position Sensor", Oct. 1961, *IBM Technical Disclosure Bulletin,* vol. 4, No. 5, pp. 24–25.

F. E. Mueller, "Dual Frequency Servo–Positioning System Employing Saturated Recording", Mar. 1978, *IBM Technical Disclosure Bulletin,* vol. 20, No. 10, pp. 4110–4111.

T. D. Howell, "Pattern for Buried Servo", Jun. 1980, *IBM Technical Disclosure Bulletin,* vol. 23, No 1, pp. 304–305.

C. Handeon et al., "Improvement in the Position Error Signal Detector Channel for a 'Buried Servo' Recording System", Aug. 1980, *IBM Technical Disclosure Bulletin,* vol. 23, No. 3, pp. 1203–1210.

M. A. Weed, "Dedicated Servo Pattern and Low–Cost Demodulator", Jul. 1987, *IBM Technical Disclosure Bulletin,* vol. 30, No. 2, pp. 657–663.

M. Padalino et al., "Track–Following Servosystem", Mar. 1969, *IBM Technical Disclosure Bulletin,* vol. 11, No. 10, pp. 1303–1304.

DIGITAL DEMODULATION OF A COMPLEMENTARY TWO-FREQUENCY SERVO PES PATTERN

BACKGROUND OF THE INVENTION

1. Field of the Invention

This invention relates generally to magnetic head servo control systems and, more particularly, to disk drive position control systems that determine the location of a head relative to disk tracks.

2. Description of the Related Art

In a conventional computer data storage system having a rotating storage medium, such as a magnetic or magneto-optical disk system, data is stored in a series of concentric or spiral tracks across the surface of the disk. A magnetic disk, for example, can comprise a disk substrate having a surface on which a magnetic material is deposited. The digital data stored on a disk is represented as a series of variations in magnetic orientation of the disk magnetic material. The variations in magnetic orientation, generally comprising reversals of magnetic flux, represent binary digits of ones and zeroes that in turn represent data. The binary digits must be read from and recorded onto the disk surface in close proximity to the disk. That is, a transducer or read/write head is provided to produce and detect variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track. Positioning read/write heads is one of the most critical aspects of recording and retrieving data in disk storage systems. With the very high track density of current disk drives, even the smallest head positioning error can potentially cause a loss of data that a disk drive customer wants to record or read. Accordingly, a great deal of effort is devoted to servo systems.

A servo control system generally maintains a read/write head in a position centered over a track by reading servo information recorded onto the disk surface. The servo information comprises a position-encoded servo pattern of high frequency magnetic flux transitions, generally flux reversals, that are pre-recorded in disk servo tracks. The flux transitions are recorded as periodic servo pattern bursts typically formed as parallel radial stripes in the servo tracks. When the read/write head passes over the servo pattern flux transitions, the head generates an analog signal whose repeating cyclic variations can be demodulated and decoded to indicate the position of the head over the disk. The demodulated servo signal is referred to as a position error sensing (PES) signal.

In a sector servo method for providing servo track information to a disk servo control system, each disk surface of the disk drive includes servo track information interspersed between binary data recorded in concentric or spiral tracks. The tracks on a sector servo disk surface are divided into radial sectors having a short servo track information area followed by a customer data area. The servo track information area, or sector, typically includes a sector marker, track identification data, and a servo burst pattern. The sector marker indicates the beginning of a servo sector to the data detection electronics, which means that servo information immediately follows in the track. The servo read head can be the same head used for reading data or can be a separate, dedicated servo head. The PES signal is used to generate a corrective input signal that is applied to the read/write head positioning servo.

FIG. 1 is a representation of a conventional quad-burst PES pattern in which magnetic transitions are recorded in bursts labeled as A, B, C, and D. The data tracks are indicated by the track numbers along the left side of the drawing figure. The tracks extend across the page, from right to left. The portion of the disk 22 shown in FIG. 1 extends approximately from track N−1.0 toward the inner diameter of the disk to track N+2.5 toward the outer diameter. Those skilled in the art will appreciate that position information is decoded by demodulating the signal generated by the head passing over the PES burst patterns to form a signal P based on:

$$P=A-b$$

and to form a quadrature signal Q based on:

$$Q=C-D.$$

The signals P and Q are quadrature signals because they are cyclic as the head moves across tracks and are out of phase by 90 degrees (one-quarter phase). The magnetic transitions that comprise the PES pattern are represented in FIG. 1 by vertical bars. The letter within each group of bars represents the PES burst recorded therein. One burst is distinguished from another by relative position in a track and relative position to the other bursts. Thus, the signal P should be zero when the head is tracking exactly along the centerline of track N, because the head will receive equal amounts of magnetic field from the A and B servo pattern bursts. A similar situation exists for tracks N+1, N+2, and so forth. For track N+0.5, the signal Q should be zero when the head is tracking exactly along the N+0.5 track centerline because the head will receive equal amounts of field from the C and D servo pattern bursts. The signal Q should be zero also for tracks N+1.5, N+2.5, and so forth.

There is a demand for ever-increasing amounts of storage capacity for customer data. One constraint on the amount of disk surface area for storing customer data is the amount of space required by the PES servo pattern itself. It should be appreciated that every bit of disk surface space freed from servo pattern usage can be shifted to customer data.

From the discussion above, it should be apparent that there is a need for a disk drive system with a PES servo pattern that increases the amount of disk surface area available for storage of customer data. The present invention fulfills this need.

SUMMARY OF THE INVENTION

The present invention utilizes a servo pattern having bursts that are constructed from two frequencies in a complementary arrangement so that the servo pattern frequencies alternate in adjacent servo tracks. A servo pattern arranged in this way uses less disk surface area as compared with typical quadrature servo patterns and can be recorded on the disk using fewer servowrite steps. The complementary arrangement of the servo bursts decreases signal gain differences between the frequencies and improves the accuracy of servo position information. The servo information at the two frequencies can be decoded by a pair of digital notched filters so that each filter notches out readback signal data from a different one of the frequencies and forms a position error sensing (PES) signal from each respective frequency that is used for controlling movement of the actuator servo of a disk drive system. The digital notched filter provides efficient processing of the readback signal and enhances easier selection of filter parameters and easier design of the servo processing circuitry. Thus, disk drive systems can achieve better servo tracking performance, have greater disk storage capacity, and can be produced more economically.

The complementary, two-frequency servo pattern minimizes servo pattern burst gaps that ordinarily are associated with amplitude sensing servo patterns and eliminates the need for servo pattern phase alignment. The detection of the complementary, two-frequency servo pattern can be provided by digital sampling techniques or by analog processing circuits. Signal processing circuits equivalent to digital notch filter functions can be used for processing the sampled readback data and can produce an improved PES signal for disk servo control. Both dual burst and quadrature burst patterns can be used.

Other features and advantages of the present invention should be apparent from the following description of the preferred embodiment, which illustrates, by way of example, the principles of the invention.

DESCRIPTION OF THE PREFERRED EMBODIMENTS

Two-Frequency, Dual Burst Pattern

Figure 1:
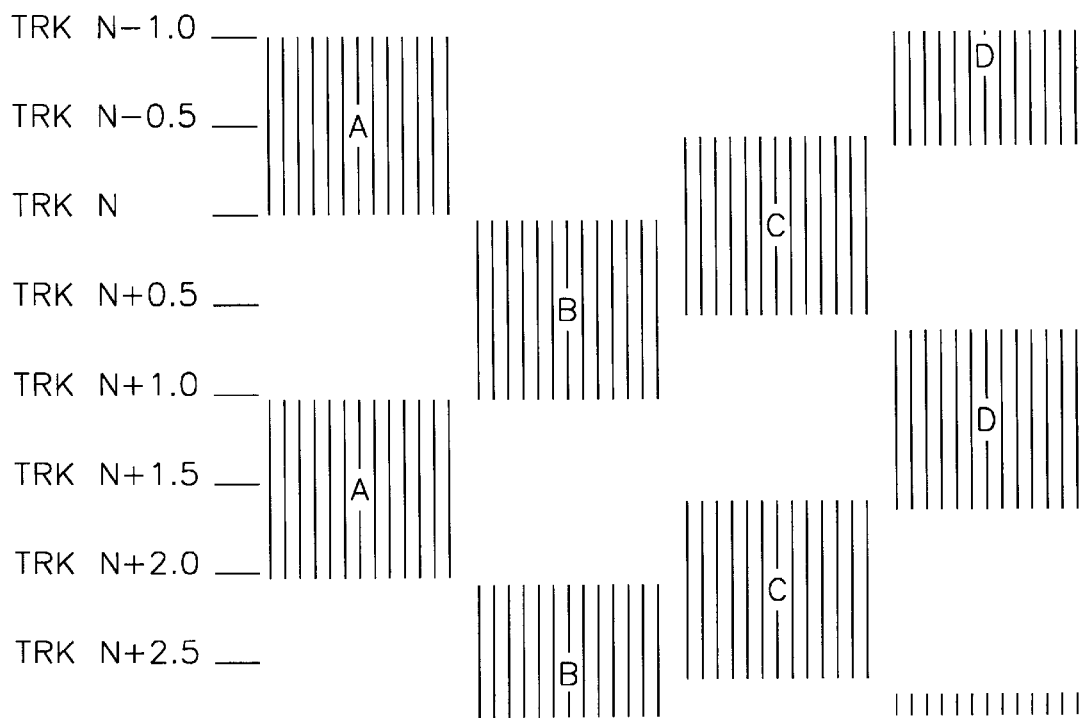
FIG. 1 a representation of a conventional single-frequency, quad-burst PES pattern such as recorded into a sector servo disk.
Figure 2:
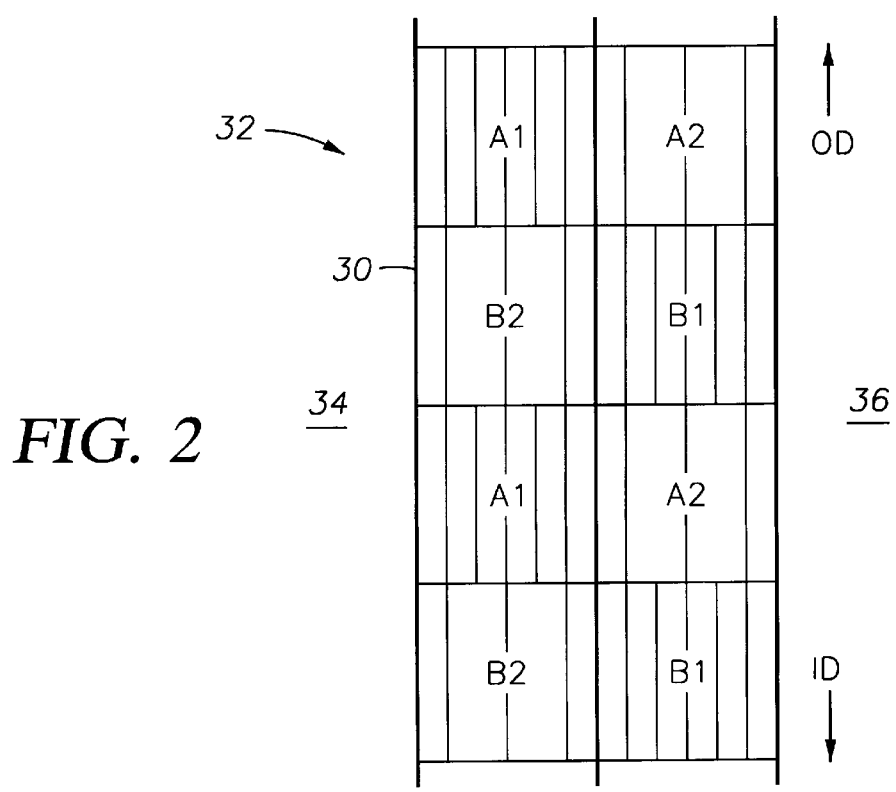
FIG. 2 is a representation of a dual burst, two-frequency servo pattern recorded into a sector servo disk in accordance with the present invention using two servo pattern tracks per data track.

FIG. 2 shows a dual burst, complementary two-frequency servo pattern 30 recorded on a disk 32 in accordance with the present invention. The pattern 30 is located on the disk in between a sector marker field 34 and a data field 36. A magnetic head detects the servo pattern when moved relative to the pattern in a transducing direction, from the sector marker field 34 to the data field 36. The servo pattern bursts are represented as areas of vertical stripes. The fields A1 and B1 represent magnetic transitions recorded at a first frequency f1 and the fields A2 and B2 represent magnetic transitions recorded at a second frequency f2, different from f1. The servo bursts A1 and A2 are recorded in one servo track, and the servo bursts B1 and B2 are recorded in the adjacent servo track. One PES signal component is obtained from the difference signal A1−B1, and the other PES signal component is obtained from the difference signal B2−A2. Thus, the FIG. 2 pattern provides a dual burst servo arrangement. In FIG. 2, the disk outer diameter (OD) is toward the top of the drawing figure and the disk inner diameter (ID) is toward the bottom of the drawing figure.

FIG. 2 servo pattern can be characterized as having servo bursts placed in a complementary arrangement in that equal-length servo bursts of diagonally opposite servo burst fields have the same frequency, different from the immediately adjacent servo burst, in a "checkerboard" pattern. FIG. 2 shows that null bursts, or gaps, are substantially minimized or eliminated with this type of servo pattern. Those skilled in the art will appreciate that conventional servo patterns typically require areas between servo bursts that have no servo pattern bursts and therefore comprise gaps between servo bursts that are equal in size to the bursts themselves.

It should be apparent that the servo pattern illustrated in FIG. 2 has gaps between servo pattern bursts that are substantially shorter in size than the servo pattern bursts themselves. Because the FIG. 2 complementary servo pattern is missing the type of gaps that otherwise would exist with conventional servo patterns, the illustrated complementary servo pattern can be of reduced length (reduced by approximately one-half) as compared with conventional servo patterns. In particular, the lengths of the servo pattern bursts A1, B1, A2, B2 can be reduced when compared with conventional servo pattern bursts. The complementary arrangement of the f1 frequency burst components (A1, B1) relative to the f2 frequency burst components (A2, B2) results in averaging of the readback signal for differences in relative gain, so that the two frequencies need not be close to each other in magnitude. Nevertheless, closer frequencies for f1 and f2 make it easier to provide processing circuitry with improved frequency response and make it easier to design and provide automatic gain processing circuitry.

The servo bursts depicted in FIG. 2 can be recorded using otherwise conventional techniques to write the novel servo pattern bursts comprising the complementary, two-frequency pattern illustrated. That is, each servo pattern burst can be recorded using a so-called move and write process that records a first servo pattern burst from the f1-frequency bursts (such as A1) and then records a first servo pattern burst from the f2-frequency bursts (such as A2) on one location of the read/write head, moves the read/write head radially across the disk, and then records a servo pattern burst from the opposite f2-frequency burst (such as B2) and then from the opposite f1-frequency burst (such as B1) at a disk location offset from the first servo bursts (A1, A2) by one servo track, while simultaneously trimming the first servo pattern bursts. This process is repeated from pass to pass until the entire servo pattern is recorded.

Two-Frequency, Quad Burst Pattern

Figure 3:
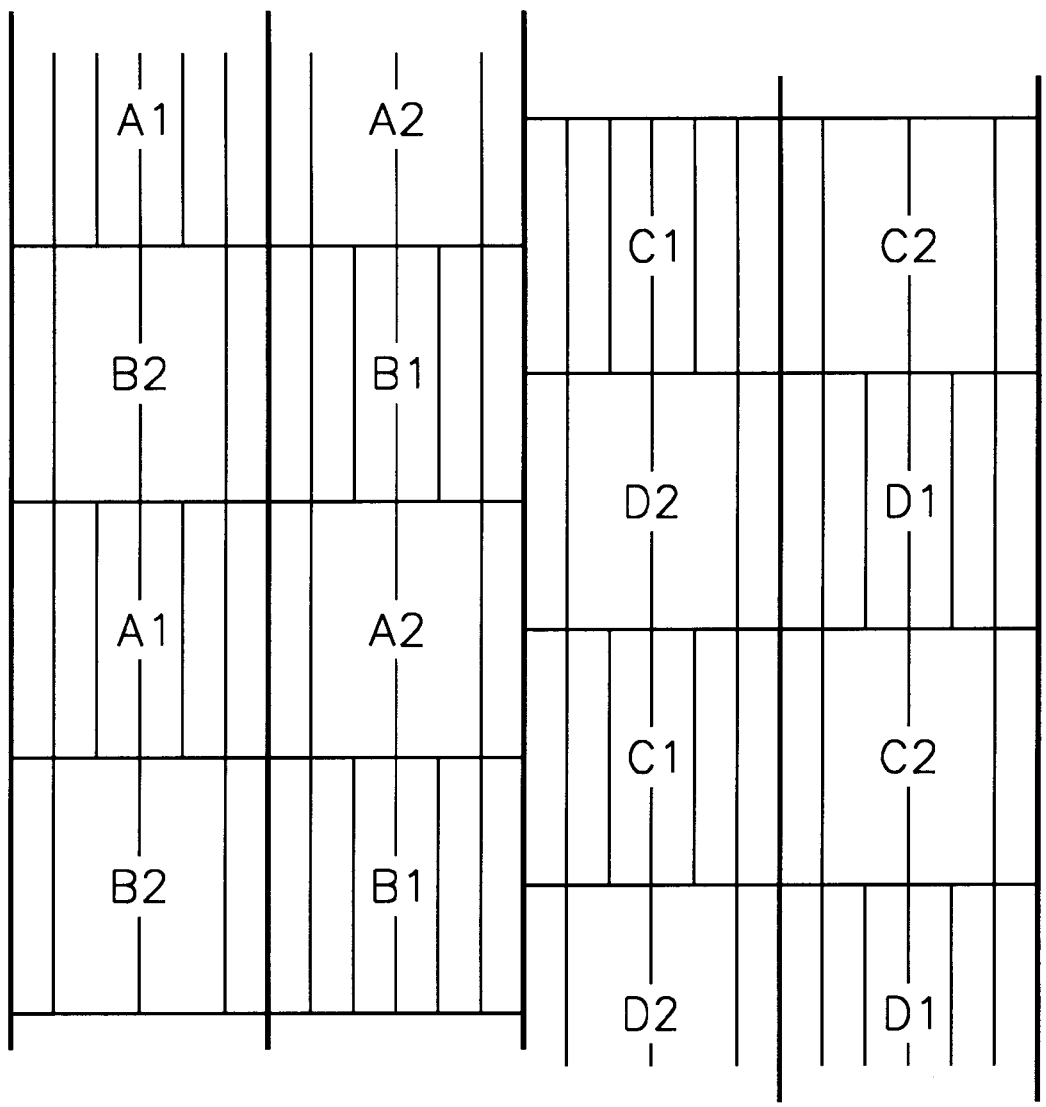
FIG. 3 is a representation of a quad burst, two-frequency servo pattern recorded into a sector servo disk in accordance with the present invention.

FIG. 3 shows the complementary, dual burst pattern of FIG. 2 followed by a second two-frequency, complementary dual burst pattern having bursts C1, D1, C2, D2. It is to be understood that the fields C1 and D1 represent magnetic transitions recorded at a first frequency f1 and that the fields C2 and D2 represent magnetic transitions recorded at a second frequency f2. The servo bursts C1 and C2 are recorded in one servo track, and the servo bursts D1 and D2 are recorded in the adjacent servo tracks. The second set of servo bursts (C1, D1, C2, D2) are preferably offset from the first set (A1, B1, A2, C2) in the radial direction by one-half servo track width. Thus, the FIG. 3 pattern provides a complementary quad burst servo pattern having two dual burst patterns with two frequencies each.

The FIG. 3 servo pattern is recorded in a process similar to that for recording the FIG. 2 servo pattern. That is, an f1-frequency servo burst A1 from the first set of servo bursts is recorded with the read/write head; then an f2-frequency servo burst A2 from the first set of servo bursts is recorded; next the read/write head is moved radially and an f1-frequency servo burst C1 from the second set of servo bursts is recorded at one-half servo track offset from the A1 servo burst; then an f2-frequency servo burst C2 is recorded; next the read/write head is moved radially one-half track and an f2-frequency servo burst B2 is recorded, followed by an f1-frequency servo burst B1. The head is again moved radially one-half track to write the f2-frequency B2 burst and the f1-frequency B1 burst. The process is repeated until the quad burst, two-frequency servo pattern is recorded.

Disk Drive System

Figure 4:
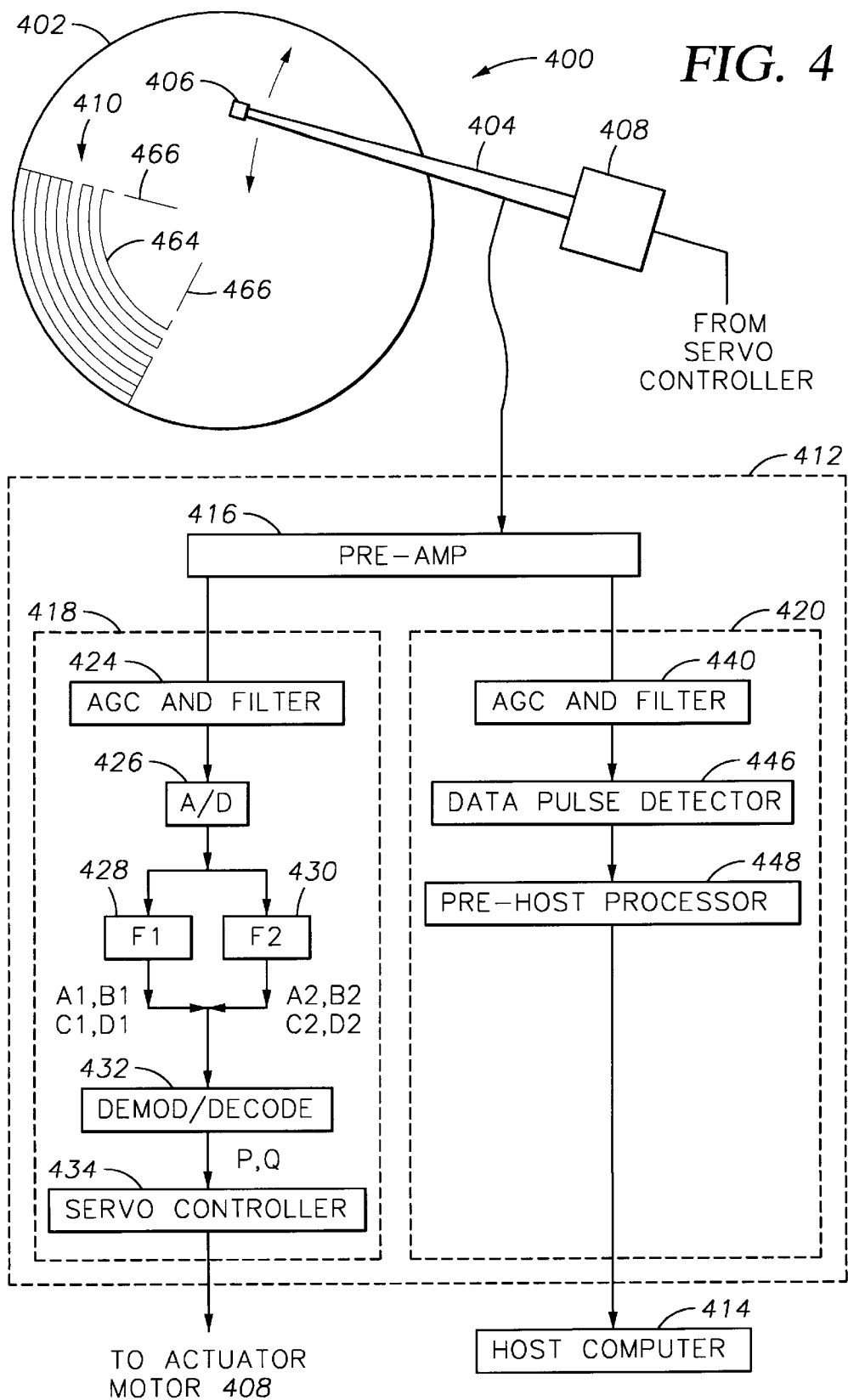
FIG. 4 is a representation of a disk drive system constructed in accordance with the present invention showing the servo channel read circuits and the data channel read circuits.

The complementary, two-frequency servo patterns of the type illustrated in FIG. 2 and FIG. 3 are implemented in conjunction with a magnetic disk drive 400, in an arrangement such as that depicted in FIG. 4. The disk drive 400 may include one or more individual disks for storing magnetically encoded information. For ease of explanation, however, only one disk 402 is illustrated in FIG. 4. The disk drive 400 also includes an actuator 404 with a read/write head 406. The position of the actuator 404 is changed by an actuator motor 408 under the control of a servo controller 434. The actuator motor 408 pivots the actuator, thereby changing the position of the read/write head 406 with respect to concentric tracks 410 of data contained on the disk 402. Although rotary movement of the actuator 404 is depicted for illustrative purposes, the disk drive 400 may alternatively use another positioning scheme, such as linear extension/retraction of the actuator 404.

The operation of the disk drive 400 is managed by a disk drive controller 412, which also serves as an interface between the disk drive 400 and a host computer 414. The host computer may comprise, for example, a desktop computer, a notebook computer, a mainframe computer, or another digital processing device for which storage of data on a disk is desired.

The controller 412 includes a readback signal preamplifier 416 ("pre-amp"), which receives electrical signal representations of recorded magnetic transitions sensed by the read/write head 406 from the disk 402. Because the disk 402 uses a sector servo positioning system, the pre-amp 416 serves a dual purpose by amplifying either data signals or servo signals, depending on whether the read/write head 406 is positioned over stored customer data or servo patterns, respectively. A write circuit is also provided to supply the read/write head 406 with data signals to be written to the disk 402. The write circuit is described in greater detail below, in conjunction with FIG. 5. The readback signal processing will be described next.

Reading from the Disk

The amplified signal from the pre-amp 416 is directed to two processing channels: a servo channel 418 and a customer data channel 420. The servo channel processing includes servo signal filtering for both of the frequencies f1 and f2 with which the servo pattern bursts are recorded. The servo signal filter processing will be described in greater detail, below.

When operating in conjunction with the data channel 420, the pre-amp 416 amplifies signals provided by the read/write head 406 that correspond to customer data stored on the disk 402. Amplified data signals from the pre-amp are then directed to a data channel automatic gain control and filter circuit 440. Then, a data pulse detector 446 forms digital data pulses corresponding to the analog signals provided by the circuit 440. Next, a pre-host processor 448 converts the data pulses into formatted data strings that are specifically compatible with the host computer 414. The pre-host processor 448 also performs decode and error correction control processing functions known to those skilled in the art.

In contrast to the data channel 420 function to read customer data, the servo channel 418 functions to read servo information from the disk 402 to aid in properly positioning the read/write head 406 over the disk. When operating in conjunction with the servo channel 418, the pre-amp 416 amplifies servo signals produced when the read/write head 406 senses servo pattern bursts. The servo channel 418 includes an automatic gain control (AGC) and filter circuit 424, which may comprise any one of various known circuits for automatically adjusting the head readback signal gain and filtering it. The filtering function of the circuit 424 can be implemented by analog frequency cancellation circuitry that rejects undesirable readback signal components, such as signal components sensed from side tracks or adjacent tracks of the disk relative to the track being followed. An analog-to-digital converter block (A/D) 426 converts the analog signal to a digital representation.

The amplified and converted head readback signal is then provided to a servo signal filter block comprising two filters, a filter 428 for the first frequency f1 and a filter 430 for the second frequency f2. The f1 and f2 filters remove respective signal components for the alternative frequency signal. As illustrated in FIG. 4, the output of the respective f1 and f2 filters are the servo pattern burst signals (A, B, C, and D in the case of the quad burst pattern illustrated in FIG. 3).

In the preferred embodiment, the f1 and f2 filters 428, 430 are implemented as digital filters. The first filter 428 performs a digital notching function for the frequency content of the second frequency f2 and any other unwanted signal components, while retaining the frequency content of the first frequency f1. The second filter 430 performs a similar digital notching function for the first frequency f1 components and other unwanted components while retaining the second frequency f2 components.

The data from the filters 428, 430 is provided to a demodulator and decoder block (demod/decode) 432, which accumulates signal samples and processes the information to derive a position error sensing (PES) signal, which is related to the position of the read/write head 406 with respect to the desired track center and is indicative of the read/write head position error, as will be described in more detail subsequently. The PES signal is then used by a servo controller 434 to generate a position correction signal that, when provided to the actuator 404, controls the position of the read/write head 406. The actuator motor 408 may, in an exemplary embodiment, comprise a voice coil motor.

Writing to the Disk

Figure 5:
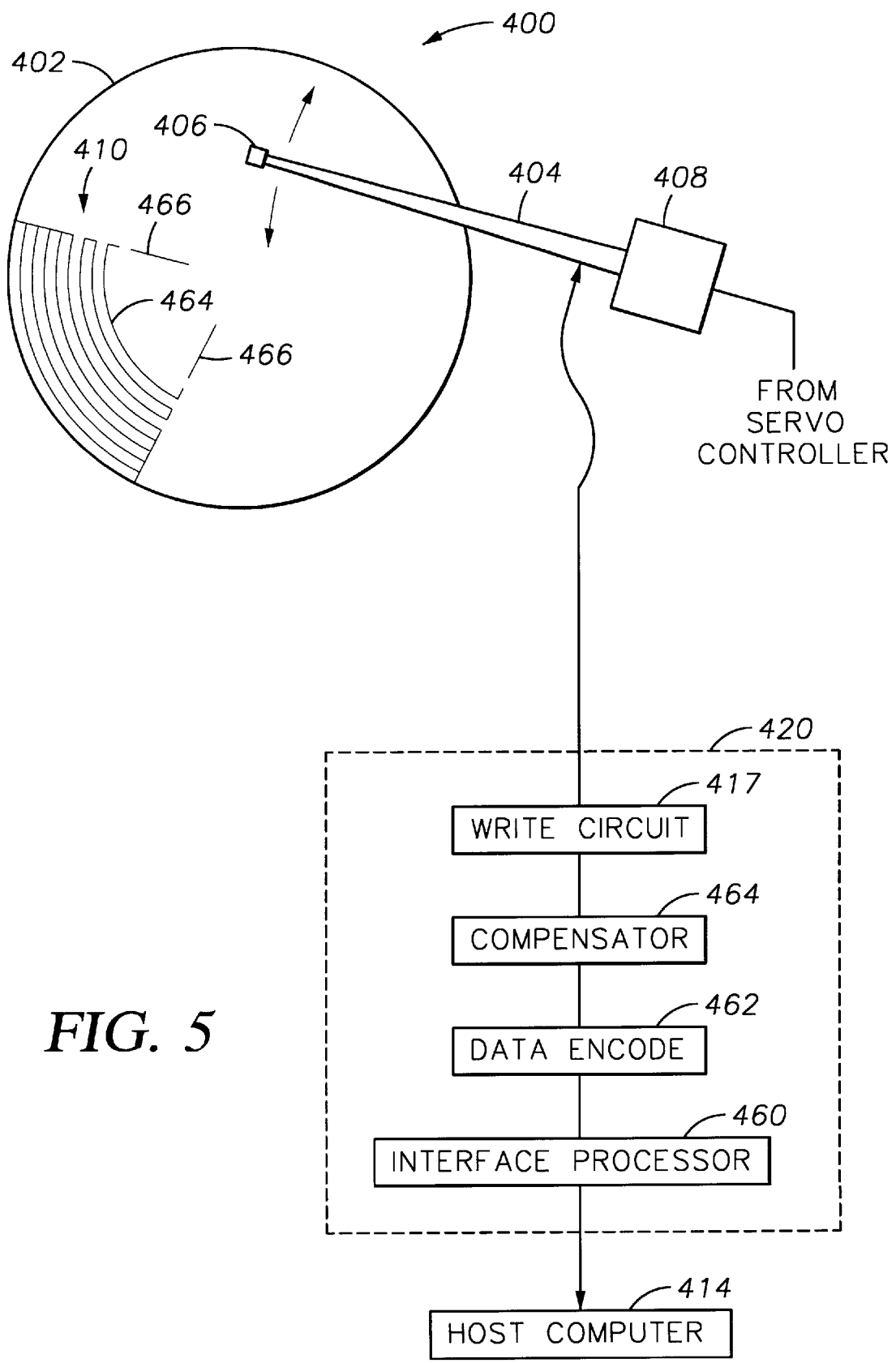
FIG. 5 is a representation of a disk drive system constructed in accordance with the present invention showing the write circuits for the data channel information.

FIG. 5 shows the operation of the circuitry associated with the write function. The servo pattern is recorded into (and read from) tracks across the disk 402. In FIG. 5, there are concentric lines 464 that designate tracks of the disk, which are divided into sectors that are delineated by radial lines 466. The tracks can include several repeated cycles of a servo pattern and can encompass one or more tracks of customer data between the servo patterns. Each sector includes a servo information field followed by a customer data field. After the servo pattern has been recorded and disk production is complete, a user can record and read customer data from the customer data field using, for example, the system illustrated in FIG. 4.

The host computer 414 generates customer data to be written into data tracks of the disk, or provides servo burst data for recording the servo pattern into the disk 402. The host computer information is received by an interface processor 460 that converts the data into formatted data strings or, if necessary, uses a pattern generator to produce the appropriate servo burst data. The data is next encoded by a data encoder block 462. A compensator 464 performs final signal processing prior to writing, and then the data is provided to the write circuit 417 that sees to it that the appropriate data is recorded.

Exemplary Digital Filters Of The Servo Channel

The two-frequency, complementary servo patterns described above eliminate the requirement of servo pattern phase alignment and minimize servo burst pattern gaps otherwise inherent with conventional amplitude-sensed servo patterns. Detection of the servo bursts can be accomplished with digital sampling or analog processing. In the preferred embodiment, digital sampling is carried out with notch filter processing.

Figure 6:
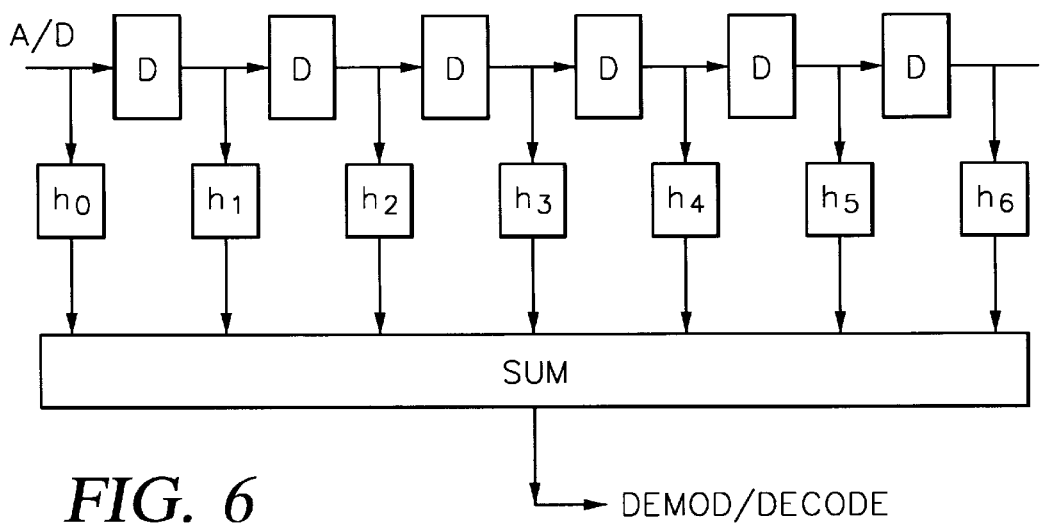
FIG. 6 is a block diagram representation of the FIR filter used in the system illustrated in FIG. 4.

FIG. 6 shows the operation of either one of the filters 428, 430 that are illustrated in FIG. 4. As noted above, each filter retains readback signal content associated with the frequency for which it is designed and rejects content associated with all other frequencies. The digital filter implementation of FIG. 6 includes multiple delay elements D arranged in a delay line 452. In FIG. 6, there are six delay elements. The delay elements D receive the signal samples from the A/D block 426 and serially delay them to a bank of multipliers 454 that apply predetermined coefficients to provide desired filter operation. The coefficient applied to the last received signal sample, which will not be subject to delay, is denoted h0. The coefficient applied to the next-to-last received sample, which is delayed by one block D, is denoted h1. This arrangement is repeated through h2, h3, . . . , to h6. Those skilled in the art will be familiar with the coefficients necessary to provide the desired filter functioning. The results of the coefficient processing from the bank of multipliers 454 is provided to a summer 456, which sums the results and provides the PES information to the demodulator 432 (FIG. 4).

More particularly, the processing of the digital filter depicted in FIG. 6 is equivalent to a finite impulse response (FIR) filter and can be expressed as follows:

$$Z(n) = \Sigma H(I) \times X(n-I)$$

where X(n–I) are the input (readback) signal samples; Z(n) is the output of a filter, so there will be a Z1 for the first filter and a Z2 for the second filter; and the H(I) are length-N coefficients. For the FIG. 6 filter, N=7 for the filter coefficients h0, h1, h2, . . . , h6. For example, in the FIG. 2 pattern, there are servo bursts A1, B1, A2, and B2. Therefore, for the first frequency, the output will be A1 and B1 values, and the output of the filter will comprise Z(a) values when the read/write head is over an A1 servo burst and Z(b) values when the read/write head is over a B1 servo burst. That is, in the Z equation above, n=a, b for the FIG. 2 dual burst pattern. In the case of the FIG. 3 quad burst pattern, n=a, b, c, d. Alternatively, the filtering process performed by the FIG. 6 filter can be performed with a relatively simple adder-only circuit, which will be known to those skilled in the art. In any case, the filter output is sent to the demodulator.

After receiving the filter output described above, the demodulator 432 produces accumulated PES signal components A1, A2, B1, B2, C1, C2, D1, and D2 according to the equations:

$$A1 = \Sigma Z1(a);$$
$$A2 = \Sigma Z2(a);$$
$$B1 = \Sigma Z1(b);$$
$$B2 = \Sigma Z2(b);$$
$$C1 = \Sigma Z1(c);$$
$$C2 = \Sigma Z2(c);$$
$$D1 = \Sigma Z1(d);$$
$$D2 = \Sigma Z2(d);$$

where Z1(a) is the output of the first filter for the A1 bursts, Z1(b) is the output of the first filter for the B1 bursts, Z2(a) is the output of the second filter for the A2 bursts, and Z2(b) is the output of the second filter for the B2 bursts. Similarly, Z1(c) is the output of the first filter for the C1 bursts, Z1(d) is the output of the first filter for the D1 bursts, Z2(c) is the output of the second filter for the C2 bursts, and Z2(d) is the output of the second filter for the D2 bursts.

Those skilled in the art will appreciate that the weights of the filter processing are determined by the sampling frequency $f_s$ used, and the frequency points to be notched out, or removed. The zero terms (the filter coefficients) are $$(Z - e^{(-j\theta)})$$

wherein $$\theta = 2\pi f_i / f_s$$

and $f_i$ is the frequency to be notched out at the $f_s$ sampling frequency. For example, to notch out frequency points of $(\frac{1}{8})f_i$, $(\frac{3}{8})f_i$, and $(\frac{4}{8})f_i$ while retaining the frequency point of $(\frac{2}{8})f_i$, the frequency content of the A1 and B1 signals for a signal having a main frequency of $(\frac{2}{8})f_i$, the H coefficients described above should be given by "–1 0 1 0 –1 0 1". In an alternate rotation system the zero terms will be represented by z–exp(–jθ)

For easier implementation with fixed tap logic circuits, non-integer coefficients can be rounded up to obtain an adequate result. The fixed tap notching circuits (also called frequency cancellation circuits) as shown above need no standard forms of FIR filtering circuitry and can combine PES accumulation processing or integration circuits for a simple logic structure.

Figure 7:
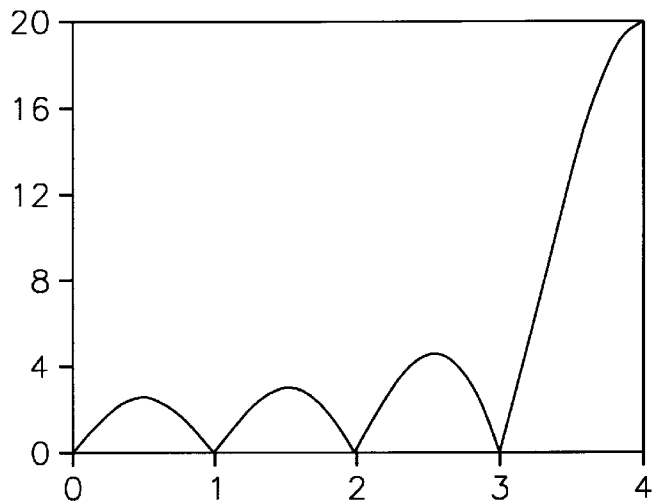
FIG. 7 is a diagram showing the frequency response of the first filter of the system illustrated in FIG. 4.
Figure 8:
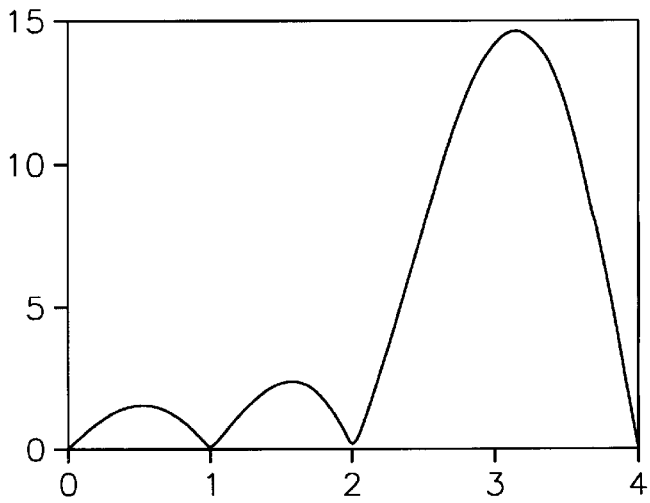
FIG. 8 is a diagram showing the frequency response of the second filter of the system illustrated in FIG. 4.

Sample frequency responses of the notching filter operations are illustrated in FIG. 7 and FIG. 8, where the amplitude of the response on the vertical axes are plotted against a normalized frequency $f_x$ being filtered. FIG. 7 and FIG. 8 illustrate that the frequencies f1 and f2 for A1, B1 and A2, B2, respectively, should be three times (FIG. 7) and four times (FIG. 8) the fundamental frequency of $f_x$. Such a selection gives the sharp notching illustrated. Thus, a fundamental frequency of 1 MHZ implies that a satisfactory frequency f1 would be 3 MHZ and a satisfactory frequency f2 would be 4 MHZ.

Thus, designing the filter coefficients for the FIG. 6 digital filter implementation of the filtering function involves the following steps:

1. Select the sampling frequency fs for the servo burst samples.
2. Select the first PES frequency (the frequency at which the first bursts such as A1 and B1 will be recorded).
3. Select zeroes using the z−exp(−jθ) equation for the first PES frequency and the second filter.
4. Select zeroes using the z−exp(−jθ) equation for the second frequency and the first filter.

This selection provides filter behavior such as illustrated in FIG. 7 and FIG. 8.

In the read circuit 418 (FIG. 4), the f1 and f2 filters 428, 430 can alternatively be implemented in an analog scheme and without using the preceding ADC circuit. The analog implementation usually results in a more complicated circuit and produces a higher level of errors due to the non-sinusoidal nature of the servo signal.

PES Demodulation

Figure 9:
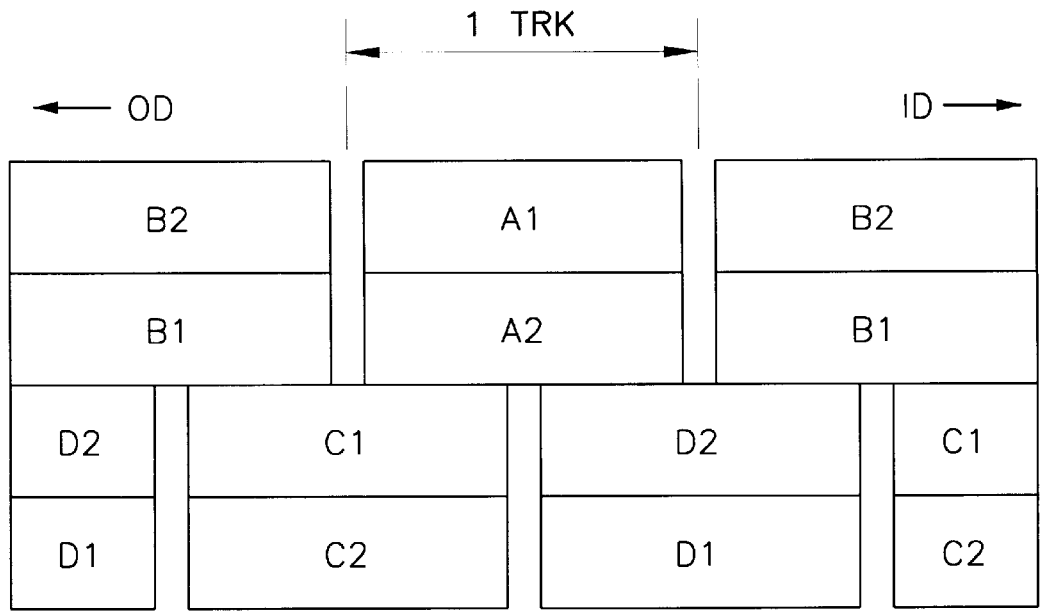
FIG. 9 is a representation of a quad burst two-frequency servo pattern, such as illustrated in FIG. 3, arranged on the page such that the disk tracks run vertically up and down the page.
Figure 10:
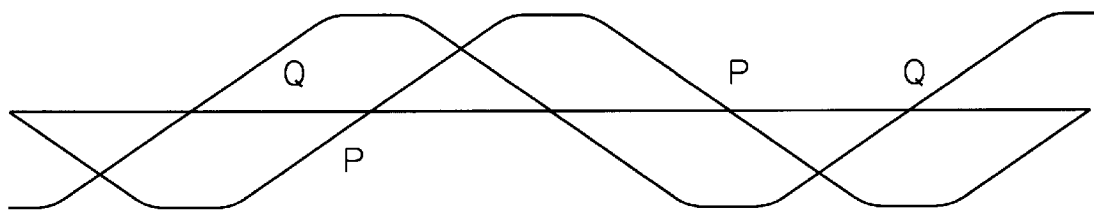
FIG. 10 is a representation of the PES signal P and Q values corresponding to the servo pattern illustrated in FIG. 9.
Figure 11:
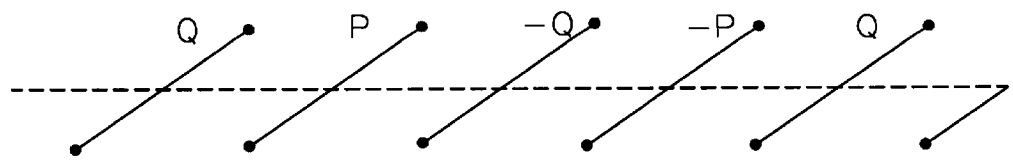
FIG. 11 is a representation of the stitched PES signal produced by the demodulator of the servo control system illustrated in FIG. 5 for the P and Q values illustrated in FIG. 10.

The processing for PES demodulation is illustrated in FIGS. 9, 10, and 11 for a two-frequency, quad burst servo pattern in accordance with the present invention. FIG. 9 shows the two-frequency, quad burst servo pattern arranged so that the servo tracks run vertically up and down the drawing sheet, the disk inside diameter (ID) is to the right side of the drawing and the disk outside diameter (OD) is to the left side of the drawing. FIG. 10 is a graph of the P and Q values associated with the corresponding the read/write head position relative to the FIG. 9 servo pattern. For example, if the read/write head is tracking exactly between the A bursts and the B bursts shown in FIG. 9, that is, directly over the centers of the D or C bursts, then the value of the P component of the PES signal should be zero because:

$$P=(A1-B1)+(A2-B2),$$

and the value of the Q component of the PES signal should be at a maximum, because:

$$Q=(C1-D1)+(C2-D2).$$

This should be apparent from review of FIG. 10. Similarly, if the read/write head is tracking exactly between the C bursts and the D bursts, that is, directly over the centers of the A or B bursts, then the value of the Q component should be zero and the value of the P component should be at a maximum. A stitched PES signal then can be produced using the simple function:

$$PES=-Q \times sgn(P), |P|>|Q|, \text{ and}$$
$$PES=P \times sgn(Q), |Q|>|P|,$$

where the function "sgn" indicates the sign (polarity) of P or Q, respectively, and "x" indicates multiplication.

Thus, the P and Q signals are cyclic, having peaks and valleys, as the read/write head is moved laterally across the disk. This is how read/write head position can be determined from the PES signal. Unfortunately, due to readback head characteristics, the peaks and valleys of the corresponding PES signal will not necessarily provide a linear function with respect to the head position; rather, there are regions of nonlinear response. To ensure a more linear combined PES signal, it is typical to create a stitched PES signal by selecting between either the P signal or the Q signal, depending on which signal is in a linear operating range.

The resulting stitched PES signal (FIG. 11) indicates the direction in which the read/write head should be moved to maintain the head centered between the corresponding track centers, either centered between A and B bursts or between C and D bursts. Those skilled in the art will understand how to utilize the illustrated stitched PES signal in servo control without further explanation.

ADVANTAGES OF THE INVENTION

Disk drive systems that utilize servo patterns constructed in accordance with the present invention, having bursts that are constructed from two frequencies in a complementary arrangement so that the servo pattern frequencies alternate in adjacent servo tracks, can have a higher data storage capacity because the servo pattern takes up less space on the disk. The complementary servo pattern can be decoded by a pair of digital notched filters so that each filter notches out readback signal data from a different one of the frequencies to form a combined PES signal produced from each respective frequency. In addition to having greater storage capacity, a disk with a servo pattern arranged in this way can be recorded using fewer servo write steps because the pattern is more compact. Also, with careful selection of the f1 and f2 frequencies, the complementary arrangement of the servo bursts decreases signal gain differences between the frequencies and improves the accuracy of servo position information.

The present invention has been described above in terms of presently preferred embodiments so that an understanding of the present invention can be conveyed. There are, however, many configurations for disk storage systems and servo control systems not specifically described herein but with which the present invention is applicable. The present invention should therefore not be seen as limited to the particular embodiments described herein, but rather, it should be understood that the present invention has wide applicability with respect to disk storage systems and servo control systems generally. All modifications, variations, or equivalent arrangements that are within the scope of the attached claims should therefore be considered to be within the scope of the invention.

We claim:

1. A servo control system that positions a magnetic head relative to multiple tracks of a magnetic storage medium, the system comprising:

a head assembly having at least one read head for reading servo information interspersedly recorded in the multiple tracks between customer data areas and for generating a head readback signal;

a servo signal filter that receives a head readback signal produced from one or more servo burst sets of the servo information, the servo burst sets comprising a repeating sequence of magnetic transitions extending across the width of servo tracks that define a servo burst A1 and a servo burst B1, both having transitions at a first frequency f1 and being located in adjacent servo tracks in a complementary arrangement, and a servo burst A2 and, a servo burst B2, both having transitions at a second frequency f2 different from f1 and being located in adjacent servo tracks in a complementary arrangement, wherein the filter includes an f1-filter and an f2-filter, such that the f1-filter produces filtered servo signal data samples with f2 frequency components removed, and the f2-filter produces filtered servo signal data samples with f1 frequency components removed;

a demodulation processor that receives the filtered readback signal from the f1-filter and from the f2-filter, and produces a position error signal that indicates the read head position relative to a track, the position error signal being based on a difference between amplitudes of the servo bursts A1 and B1 and a difference between amplitudes of the servo bursts A2 and B2;

a servo assembly that is activated to position the head assembly relative to the magnetic storage medium; and a servo controller that receives the position error signal and controls the servo assembly in accordance with the position error signal to maintain the magnetic head centered relative to the track.

2. A servo control system as defined in claim 1, wherein the f1-filter and f2-filter comprise digital filters.

3. A servo control system as defined in claim 2, wherein the f1-filter and f2-filter comprise finite impulse response filters that provide their respective filtered servo signals by performing notching filter functions.

4. A servo control system as defined in claim 1, wherein the servo signal filter performs analog filtering.

5. A servo control system as defined in claim 1, wherein the head readback signal received by the servo signal filter is produced from a servo burst set further comprising a repeating sequence of magnetic transitions extending across the width of servo tracks that define a servo burst C1 and a servo burst D1, both having transitions at the first frequency f1 and being located in adjacent servo tracks in a complementary arrangement, and a servo burst C2 and servo burst D2, both having transitions at the second frequency f2 and being located in adjacent servo tracks in a complementary arrangement, and offset radially from the A1, B1, A2, B2 servo bursts.

6. A servo control system as defined in claim 1, wherein the servo pattern bursts are separated from each other by gaps shorter in size than the servo pattern bursts.

7. A servo control system as defined in claim 1, further including an analog frequency cancellation circuit that receives the head readback signal and removes unwanted signal components.

8. A disk head position control system for use in a disk drive having a magnetic storage media disk with a magnetic recording material deposited with respect to a surface of the disk, on which is interspersedly recorded servo information between customer data areas in a plurality of tracks, the disk further having a magnetic head for transducing the servo information and generating a head readback signal therefrom, the position control system comprising:

an f1-filter that receives the head readback signal having signal components including a first frequency f1 and a second frequency f2, wherein the f1-filter produces filtered readback signal data samples with f2 frequency components removed;

an f2-filter that receives the head readback signal having signal components including the first frequency f1 and the second frequency f2, wherein the f2-filter produces filtered readback signal data samples with f1 frequency components removed;

a demodulation processor that receives the filtered readback signal data samples from the f1-filter and from the f2-filter, and produces therefrom a position error signal that indicates the read head position relative to the servo track;

a disk head servo that moves the disk magnetic head relative to the surface of the magnetic storage media disk in response to the position error signal;

wherein one or more servo burst sets of the servo information comprise a repeating sequence of magnetic transitions that extend across the width of the servo tracks and define a servo burst A1 and a servo burst B1 having transitions at the first frequency f1 and located in adjacent servo tracks, and define a servo burst A2 and a servo burst B2 having transitions at the second frequency f2 and located in adjacent servo tracks; and wherein the position error signal is based on a difference between amplitudes of the servo bursts A1 and B1 and a difference between amplitudes of the servo bursts A2 and B2.

9. A disk head position control system as defined in claim 8, wherein the f1-filter and f2-filter comprise digital filters.

10. A disk head position control system as defined in claim 9, wherein the f1-filter and f2-filter comprise finite impulse response filters that provide their respective filtered servo signals by performing notching filter functions.

11. A disk head position control system as defined in claim 8, wherein the f1 and f2 filters perform analog filtering.

12. A disk head position control system as defined in claim 8, wherein the f1 filter and f2 filter receive the head readback signal produced from a servo burst set comprising a first dual burst servo pattern as described, and further comprising:

a second dual burst servo pattern comprising a repeating sequence of magnetic transitions extending across the width of servo tracks that define a servo burst C1 and a servo burst D1, both having transitions at the first frequency f1 and being located in adjacent servo tracks in a complementary arrangement, and a servo burst C2 and servo burst D2, both having transitions at the second frequency f2 and being located in adjacent servo tracks in a complementary arrangement, and offset radially from the A1, B1, A2, B2 servo bursts.

13. A disk head position control system as defined in claim 8, wherein the servo pattern bursts are separated from each other by gaps shorter in size than the servo pattern bursts.

14. A disk head position control system as defined in claim 8, further including an analog frequency cancellation circuit that receives the head readback signal and removes unwanted signal components.

15. A disk drive having:

a magnetic storage media disk on which is interspersedly recorded servo information between customer data areas, where each of one or more servo burst sets of the servo information comprise a repeating sequence of magnetic transitions extending across the width of multiple tracks that define a servo burst A1 and a servo burst B1, both having transitions at a first frequency f1 and being located in adjacent servo tracks in a complementary arrangement, and a servo burst A2 and a servo B2, both having transitions at a second frequency f2 different from f1 and being located in adjacent servo tracks in a complementary arrangement;

a head assembly having at least one read head for reading such a servo burst set recorded in the multiple tracks and generating therefrom a head readback signal;

an f1-filter that receives the readback signal having components including a first frequency f1 and a second frequency f2, wherein the f1-filter produces filtered readback signal data samples with f2 frequency components removed;

an f2-filter that receives the readback signal having signal components including the first frequency f1 and the second frequency f2, wherein the f2-filter produces filtered readback signal data samples with f1 frequency components removed;

a demodulation processor that receives the filtered readback signal from the f1-filter and from the f2-filter, and produces a position error signal that indicates the read head position relative to a track, the position error signal being based on a difference between amplitudes of the servo bursts A1 and B1 and a difference between amplitudes of the servo bursts A2 and B2;

a servo assembly that is activated to position the head assembly relative to the magnetic storage medium; and a servo controller that receives the position error signal and controls the servo assembly in accordance with the position error signal to maintain the magnetic head centered relative to the track width.

16. A disk drive as defined in claim 15, wherein the f1-filter and f2-filter comprise digital filters.

17. A disk drive as defined in claim 16, wherein the f1-filter and f2-filter comprise finite impulse response filters that provide their respective filtered servo signals by performing notching filter functions.

18. A disk drive as defined in claim 15, wherein the f1-filter and f2-filter both perform analog filtering.

19. A disk drive as defined in claim 15, wherein the servo pattern further comprises a repeating sequence of magnetic transitions extending across the width of servo tracks that define a servo burst C1 and a servo burst D1, both having transitions at the first frequency f1 and being located in adjacent servo tracks in a complementary arrangement, and a servo burst C2 and servo burst D2, both having transitions at the second frequency f2 and being located in adjacent servo tracks in a complementary arrangement, and offset radially from the A1, B1, A2, B2 servo bursts.

20. A disk drive as defined in claim 15, wherein the servo pattern bursts are separated from each other by gaps shorter in size than the servo pattern bursts.

21. A disk drive as defined in claim 15, further including an analog frequency cancellation circuit that receives the head readback signal and removes unwanted signal components.

22. A sector servo control system for positioning a magnetic head adjacent a surface of a moving magnetic storage medium having information recorded in multiple tracks, the system comprising:

a head assembly having at least one read head for reading servo information interspersedly recorded in the multiple tracks between customer data areas and generating therefrom a head readback signal, wherein one or more servo burst sets of the servo information comprise a repeating sequence of magnetic transitions that extend across the width of the servo tracks and define a servo burst A1 and a servo burst B1 having transitions at a first frequency f1 and located in adjacent servo tracks, and define a servo burst A2 and a servo burst B2 having transitions at a second frequency f2 and located in adjacent servo tracks;

an f1-filter that receives the readback signal having signal components including the first frequency f1 and the second frequency f2, wherein the f1-filter produces filtered readback signal data samples with f2 frequency components removed;

an f2-filter that receives the readback signal having signal components including the first frequency f1 and the second frequency f2, wherein the f2-filter produces filtered readback signal data samples with f1 frequency components removed;

a demodulation processor that receives the filtered readback signal from the f1-filter and from the f2-filter, and produces a position error signal that indicated the read head position relative to a track, the position error signal being based on a difference between amplitudes of the servo bursts A1 and B1 and a difference between amplitudes of the servo bursts A2 and B2;

a servo assembly that is activated to position the head assembly relative to the magnetic storage medium; and a servo controller that receives the position error signal and controls the servo assembly in accordance with the position error signal to maintain the magnetic head centered relative to the track.

23. A servo control system as defined in claim 22, wherein the f1-filter and f2-filter comprise digital filters.

24. A servo control system as defined in claim 23, wherein the f1-filter and f2-filter comprise finite impulse response filters that provide their respective filtered servo signals by performing notching filter functions.

25. A servo control system as defined in claim 22, wherein the f1-filter and f2-filter comprise digital filters.

26. A servo control system as defined in claim 22, wherein the servo information further comprises one or more servo burst sets having a repeating sequence of magnetic transitions extending across the width of servo tracks that define a servo burst C1 and a servo burst D1, both having transitions at the first frequency f1 and being located in adjacent servo tracks in a complementary arrangement, and a servo burst C2 and servo burst D2, both having transitions at the second frequency f2 and being located in the adjacent servo tracks in a complementary arrangement, and offset radially from A1, B1, A2, B2 servo bursts similarly positioned in other servo tracks adjacent the adjacent servo tracks.

27. A servo control system as defined in claim 22, wherein the servo pattern bursts are separated from each other by gaps shorter in size than the servo pattern bursts.

28. A servo control system as defined in claim 22, further including an analog frequency cancellation circuit that receives the head readback signal and removes unwanted signal components.

29. A data storage system comprising:

a magnetic storage medium having servo information recorded on servo tracks, wherein servo bus sets of the servo information comprise a repeating sequence of magnetic transitions that extend across the width of the servo tracks and define a servo burst A1 and a servo burst B1 having transitions at a first frequency f1 and located in adjacent servo tracks, and define a servo burst A2 and a servo burst B2 having transitions at a second frequency f2 and located in adjacent servo tracks;

drive means for moving the magnetic storage medium relative to a magnetic head assembly;

a head assembly having at least one read head for reading one or more servo burst sets of the servo information and generating therefrom a head readback signal;

an f1-filter that receives the readback signal having signal components including the first frequency f1 and the second frequency f2, wherein the f1-filter produces filtered readback signal data samples with f2 frequency components removed;

an f2-filter that receives the readback signal having signal components including the first frequency f1 and the second frequency f2, wherein the f2-filter produces filtered readback signal data samples with f1 frequency components removed;

a demodulation processor that receives the filtered readback signal from the f1-filter and from the f2-filter, and produces a position error signal based on a difference between amplitudes of the servo bursts A1 and B1 and a difference between amplitudes of the servo bursts A2 and B2;

a servo assembly that is activated to position the head assembly relative to the magnetic storage medium; and a servo controller that receives the position error signal and controls the servo assembly in accordance with the position error signal to maintain the magnetic head centered relative to the track.

30. A data storage system as defined in claim 29, wherein the f1-filter and f2-filter comprise digital filters.

31. A data storage system as defined in claim 29, wherein the f1-filter and f2-filter comprise finite impulse response filters that provide their respective filtered servo signals by performing notching filter functions.

32. A data storage system as defined in claim 29, wherein the f1-filter and f2-filter perform analog filtering.

33. A data storage system as defined in claim 29, wherein the servo information further comprises one or more servo burst sets having a repeating sequence of magnetic transitions extending across the width of servo tracks that define a servo burst C1 and a servo burst D1, both having transitions at the first frequency f1 and being located in adjacent servo tracks in a complementary arrangement, and a servo burst C2 and servo burst D2, both having transitions at the second frequency f2 and being located in the adjacent servo tracks in a complementary arrangement, and offset radially from A1, B1, A2, B2 servo bursts similarly positioned in other servo tracks adjacent the adjacent servo tracks.

34. A data storage system as defined in claim 29, wherein the servo pattern bursts are separated from each other by gaps shorter in size than the servo pattern bursts.

35. A data storage system as defined in claim 29, further including an analog frequency cancellation circuit that receives the head readback signal and removes unwanted signal components.

36. A method of demodulating a head readback signal produced by a head transducing a servo pattern from a magnetic storage disk, the method comprising:

receiving components of a head readback signal including a first frequency f1 and a second frequency f2 associated with a servo burst set of servo information interspersedly recorded between customer data areas of the disk the servo burst set associated with the components comprising a repeating sequence of magnetic transitions that extend across the width of the servo tracks and defining a servo burst A1 and a servo B1 having transitions at the first frequency f1 and located in adjacent servo tracks, and defining a servo burst A2 and a servo burst B2 having transitions at the second frequency f2 and located in adjacent servo tracks;

demodulating the head readback signal components using an f1-filter and an f2-filter, wherein the f1-filter produces filtered head readback signal components with f2 frequency components removed and the f2-filter produces filtered head readback signal components with f1 frequency components removed; and producing a position error signal from the filtered readback signal components from the f1-filter and from the f2-filter, such that the position error signal indicates the read head position relative to a track width, the position error signal being based on a difference between amplitudes of f1 frequency components and a difference between amplitudes of frequency components.

* * * * *